United States Patent
Przewloka et al.

(10) Patent No.: US 9,825,892 B2
(45) Date of Patent: Nov. 21, 2017

(54) PERSONALIZED AND CONTEXT-AWARE PROCESSING OF MESSAGE GENERATION REQUEST

(71) Applicant: SAP SE, Walldorf (DE)

(72) Inventors: Martin Przewloka, Walldorf (DE); Marek Zielinski, Pretoria (ZA); Jan Eloff, Pretoria (ZA)

(73) Assignee: SAP SE, Walldorf (DE)

( * ) Notice: Subject to any disclaimer, the term of this patent is extended or adjusted under 35 U.S.C. 154(b) by 54 days.

(21) Appl. No.: 14/865,030

(22) Filed: Sep. 25, 2015

(65) Prior Publication Data
US 2017/0094050 A1    Mar. 30, 2017

(51) Int. Cl.
*H04M 1/725*    (2006.01)
*H04L 12/58*    (2006.01)

(52) U.S. Cl.
CPC .......... *H04L 51/066* (2013.01); *H04L 51/063* (2013.01); *H04M 1/72547* (2013.01); *H04M 1/72569* (2013.01); *H04M 1/72572* (2013.01)

(58) Field of Classification Search
CPC ... H04M 1/72597; H04L 51/066; H04L 51/24
See application file for complete search history.

(56) References Cited

U.S. PATENT DOCUMENTS

| | | | |
|---|---|---|---|
| 5,555,376 A | 9/1996 | Theimer | |
| 7,072,956 B2 | 7/2006 | Parupudi | |
| 7,415,104 B2 | 8/2008 | Gray | |
| 7,565,397 B2 | 7/2009 | Hodjat | |
| 7,581,188 B2 | 8/2009 | Hiles | |
| 7,613,670 B2 | 11/2009 | Horvitz | |
| 7,870,512 B2 | 1/2011 | Misovski | |
| 8,090,777 B2 | 1/2012 | Daniels-Farrar | |
| 8,396,929 B2 | 3/2013 | Helfman | |
| 8,763,010 B2 | 6/2014 | Hacigumus | |
| 8,813,060 B2 | 8/2014 | Tewari | |
| 2007/0282954 A1* | 12/2007 | Kim | G06Q 30/02 709/206 |
| 2008/0005679 A1 | 1/2008 | Rimas-Ribikauskas | |
| 2009/0036102 A1 | 2/2009 | Ho | |
| 2012/0117499 A1 | 5/2012 | Mori | |
| 2014/0004889 A1* | 1/2014 | Davis | H04W 4/12 455/466 |
| 2014/0204815 A1 | 7/2014 | Ismail | |
| 2014/0237484 A1* | 8/2014 | Dixon | G06F 9/546 719/313 |

\* cited by examiner

*Primary Examiner* — Kashif Siddiqui

(57) ABSTRACT

Various embodiments of systems and methods for personalized and context-aware processing of a message generation request are described herein. Initially a message generation request from the portable electronic device to the operating system is intercepted. Next values corresponding to a plurality of context parameters are received. The values include a personal preference of a user. Next the message generation request is processed, based on the values of the context parameter and the message generation request, to obtain a message. Finally the message is sent to the portable electronic device. The message to the portable electronic device is displayed based on the values corresponding to the plurality of context parameters.

17 Claims, 6 Drawing Sheets

US 9,825,892 B2

PERSONALIZED AND CONTEXT-AWARE PROCESSING OF MESSAGE GENERATION REQUEST

BACKGROUND

Modern operating systems allow multiple applications to be executed on a computer or a portable electronic device. At times, a user interacting with one of the application may receive messages from other applications executing on the device. For example, a user interacting with an Enterprise Resource Planning (ERP) application may receive a notification message, from an E-Mail application, that a new E-Mail is received. These notifications, from other applications, may at times be helpful to keep user updated about the applications that the user is not currently interacting. However, at other times, these messages may not be beneficial if, for example, the user is working on a critical task.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for personalized and context-aware processing of message generation request are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
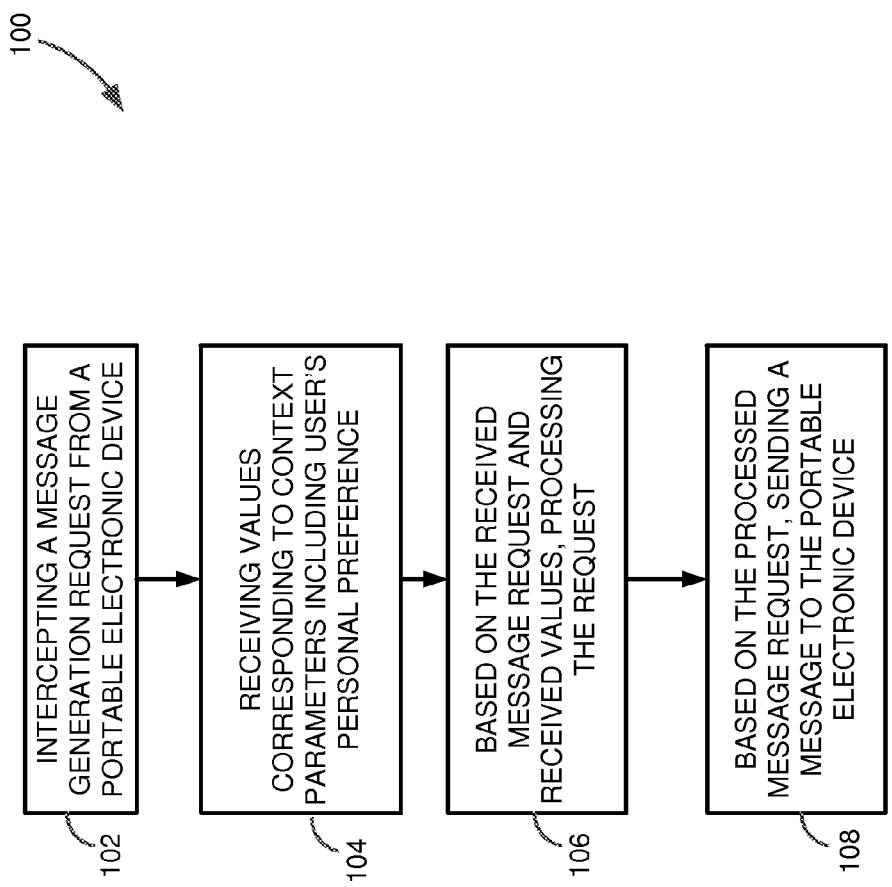
FIG. 1 is a flow diagram illustrating a process of personalized and context-aware processing of a message generation request, according to an embodiment.

FIG. 1 is a flow diagram illustrating a process 100 of personalized and context-aware processing of a message generation request, according to an embodiment. A message is information transmitted from one portable electronic device to another portable electronic device, from a human being to a portable electronic device, between two applications executing on a portable electronic device, or between two processes included in an application. A message may provide status information of an application to a user or request information from the user. A portable electronic device may be cellular or satellite telephones, laptop computers, personal digital assistants, electronic book readers, wearable devices such as wristbands, smart watches, intelligent eyewear, etc.

Initially a message generation request from a portable electronic device is intercepted (102). The portable electronic device sends the message generation request to an operating system for generating the message. Based on the content of the message generation request, the operating system may generate a message. In one embodiment, application software on the portable electronic device sends a request to the operating system for generating the message. An application software, or application, is a software program for performing a particular task. For example, the application may be an Enterprise Resource Planning (ERP) application that is a suite of integrated applications to collect, store, manage, and interpret data received from different activities.

The message generation request from the portable electronic device may be intercepted before the message reaches the operating system, e.g., by a message request listener. The message request listener is a software component that monitors message requests sent from the portable electronic device. In one embodiment, the message request listener monitors the application executed on the portable electronic device to check whether a message is being sent from the portable electronic device to the operating system. The message request listener may forward the message generation request to a message handler. A message handler is a software module that processes the message generation request to generate the message.

Next, values corresponding to context parameters are received including user's personal preference (104). Context values may include information related to the message that has to be generated, different tasks a user is performing on the portable electronic device, the current status of the tasks and/or other activities that the user is performing, user's geographical location, etc. For example, the context values may include that the user is currently working with an E-Mail application and an ERP application, the current status of the user is that the user is drafting an E-Mail using the E-Mail application and that the user is analyzing goods procurement information on the ERP application. The context values may also include status of other situational parameters of the user, for example, calendar information that provides details of meetings, vacations, or other activities of the user. The context may also include co-ordinates of the area on the user interface of portable electronic device where the user is currently focusing. In one embodiment, the context also includes a personal preference of a user. The personal preference of a user may include, for example, a particular background color or a particular text format when user is working on a particular system, for example, a portable electronic device executing on an Android® operating system or a portable electronic device executing on an iOS® operating system. In one embodiment, a context state monitor monitors the values of the different context parameters related to a user. The context state monitor may include, for example, an eye monitor on the portable electronic device that monitors the co-ordinate of the screen where the user is focusing at a particular instance. The context state monitor sends the different values of the context parameters to the message handler.

Based on the values of the context parameters and the message generation request, the message generation request is processed (106). Processing the message generation request includes performing an action on the message generation request based on the values of context parameters related to the user and the content of the message generation request. The action may include either executing the message generation request to generate a message or rejecting the message generation. In one embodiment, the message handler processes the message generation request. For processing the message generation request, the message handler retrieves a message handling policy corresponding to the values of the context parameters and the message generation request. Message handling policy is a rule including a set of conditions that identify whether the rule is applicable for processing a particular message generation request. The message handling policy also includes actions corresponding to the set of conditions. For example, a condition in a message handling policy may be "user busy" and the corresponding action in the rule may be to delay the execution of the message generation request. In case the context value of the user and the content of the message matches with the condition defined in the message handling policy then the corresponding action is executed. The message handler may either execute the message generation request itself or may forward the request to the operating system for executing the message generation request.

Finally, a message generated based on the processing of the message generation request is sent to the portable electronic device (108). The generated message may be a text message, a video message, or a voice message. In one embodiment, the values of the context information may be used for displaying the message on the user interface of the portable electronic device. For example, one of the values of context parameter may be the position (co-ordinates) of the screen where the user is focusing. Based on this context parameter value, the generated message may be displayed on the co-ordinates of the screen where the user is focusing. Thus, an improved user experience is obtained by using the user's preference along with other context information to determine when a message is to be delivered to a user, based on user's current workload and the criticality of the work the user is performing. Further, using context parameter values for displaying the messages ensures that critical messages are displayed on that portion of the user interface where the user is focusing, thus also improving the user experience as well as increasing efficiency of message handling by the user.

Figure 2:
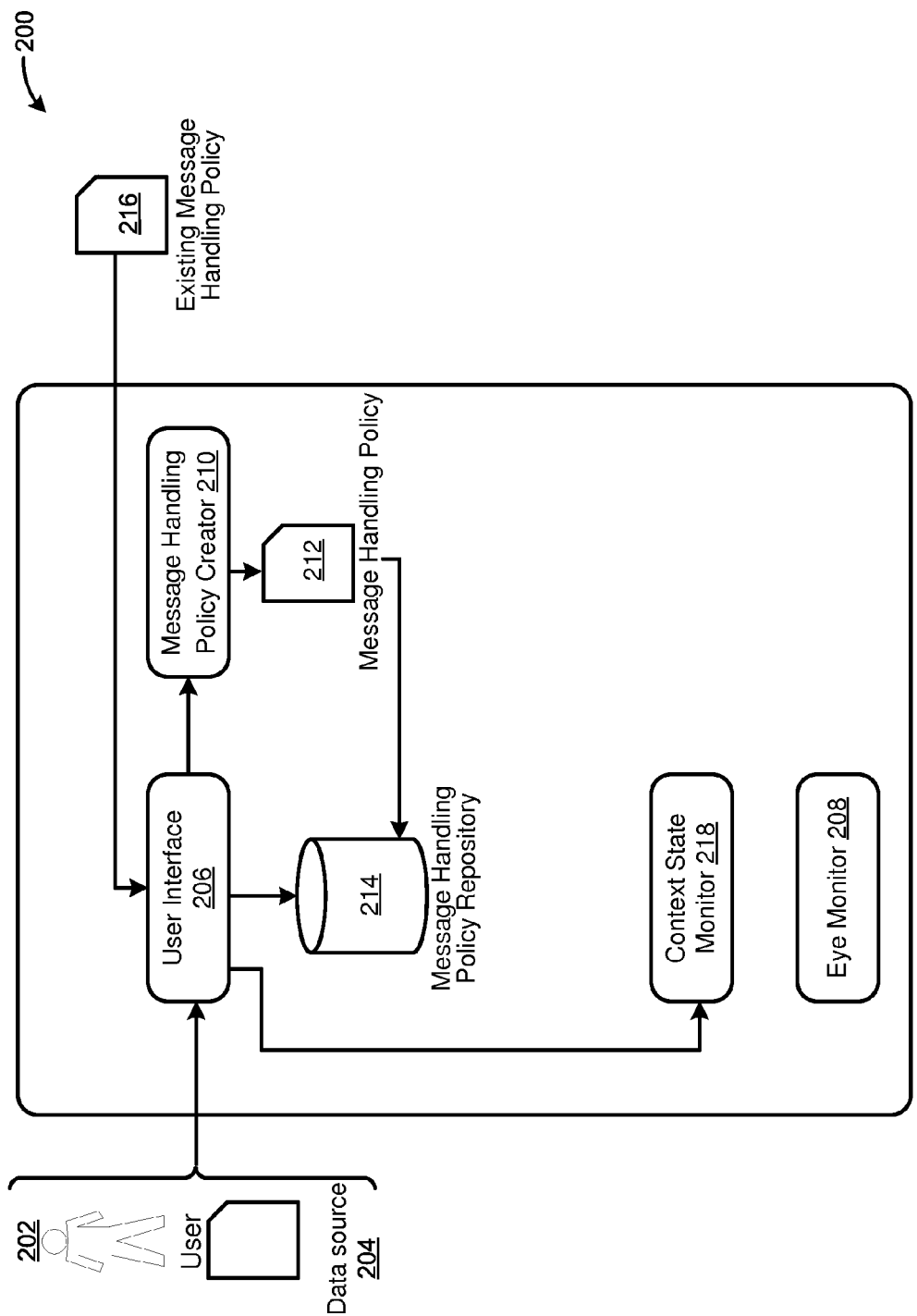
FIG. 2 is a block diagram illustrating a computing environment generating a message handling policy, according to an embodiment.

FIG. 2 is a block diagram illustrating a computing environment 200 generating a message handling policy, according to an embodiment. A message handling policy is a rule that specifies the way message request sent from an executing application to an operating system should be handled. In one embodiment, the message handling policy includes several policies for processing the message generation request. In one embodiment, the message handling policy is of the form:

{Condition}→{Action}.

The first part of a rule (e.g., {Condition}) is one or more conditions that are to be met for the particular rule to be applied to that message generation request. In one embodiment the {Condition} may be any information that triggers processing of a message generation request. The corresponding {Action} of a rule is a set of one or more actions to be performed by executing the message generation request, e.g., when the condition matches with the content of the message generation request and the user's personal preference.

In one embodiment, the condition in a message handling policy rule may be defined as one or more condition types or categories. The different condition types may be combined by Boolean expression to specify a condition of the message handling policy. The different condition categories may include for example:

Conditions related to applications on the portable electronic device that sends a message generation request to the operating system: The condition corresponding to this condition type may include the condition related to the applications sending the message generation request. For example, conditions may include the identity of an application (for example, name of the application), application author/manufacturer, application type (for example, E-Mail application, accounting application), and a priority of execution of the different applications that send the message generation request. In one embodiment, the message handling policy is not created for each of the applications on the portable electronic device. In this case, the conditions may be defined for some of the applications executing on the portable electronic device.

Conditions related to the message that is to be generated based on the message generation request: The conditions corresponding to this condition type may include, for example, conditions that define the type of message requested, example, whether the message is dialog, notification, or toasts. A dialog is a window displayed on the user interface of the portable electronic device that provides information to the user and may prompt the user to enter additional information requested at the window, or to choose an option from the various options displayed at the portable electronic device. Toasts are pop-ups with information that disappear after a limited amount of time, and notifications are messages that are displayed to a user outside the application's area on the user interface of the portable electronic device. Further the conditions may also be whether a message is an alert, for example, error, warning, information or question to user.

Conditions related to the contents of the message that is to be generated based on the message generation request: Condition corresponding to this condition type may include message parameter values of the message that is to be generated, for example, the content of the text that is to be displayed in the message, or the number and text labels of buttons that are to be provided to the user to interact with the message.

Conditions related to user's context state: The conditions corresponding to this condition type include, for example, location of the user, current user's activity, user's calendar schedule, user's current eye focus on user interface of the portable electronic device, priority level of user's current task, user's current attention level, etc.

Conditions related to user's personal preference: The conditions related to this condition type may include user's specific preference when interacting with a particular portable electronic device, for example, a portable electronic device having an Android™ operating system or a portable device having an iOS™ operating system, user's education level, or user's experience when interacting with a particular portable electronic device.

Conditions related to criticality of the current work user is performing: Conditions corresponding to this condition type may include criticality of the applications that the user is working on, for example, when the user is working on an application that can lead to personal injury or when the user is working on a time-sensitive matter.

For generating the message handling policy, initially an input may be received from a user 202 or a data source 204, for example, a data file or an application. The input from the user 202 or the data source 204 may be received at a user interface 206. The input may include, for example, the conditions and the actions for generating a message handling policy. The inputs may also include a context state definition, which includes the different context parameters that are to be monitored for generating the message requested to be generated. For example, a context state definition C may include context parameters $(c_1, c_2, c_3, \ldots c_n)$. One of the context parameters may, for example, be an area of the portable electronic device where the user 202 is focusing. The value for this context parameter may be provided by an eye monitor 208 that determines the coordinates of the user interface that the user is focusing. Next the received input is forwarded to a message handling policy creator 210, which creates the message handling policy 212 based on the received conditions and corresponding actions included in the message handling policy. The created policy is then stored in the message handling policy repository 214. A message handling policy repository 214 may be a database, file or any other data store for storing the created message handling policy 212. In one embodiment, the message handling policy 212 is created for a particular user 202 or a group of users. The message handling policy 212 includes conditions and actions dependent on the user's context and user's preference.

In one embodiment, an existing message handling policy 216 may be provided as an input at the user interface 206. For example, the existing message handling policy 216 may have been previously generated by the message handling policy creator 210 for another user. In case the existing message handling policy 216 displayed on the user interface 206 is selected then the existing message handling policy 216 is assigned as the message handling policy 212 for the user. The existing policy is then stored in the message handling policy repository 214 as the message handling policy of the user.

Next the context state definition, including context state parameters, which is received as input information related to the context state services, for example, the eye monitor 208 that are to be used for determining the values of context parameters are provided to a context state monitor 218. The context state parameters indicate to the context state monitor 218 the parameters that are to be monitored using the different context state services. For example, a context state definition including the context state parameter "eye focus" may be provided as input to the context state monitor 218 along with the context state service "eye monitor" 208 that provides the coordinates of eye focus to the context state monitor 218.

Figure 3:
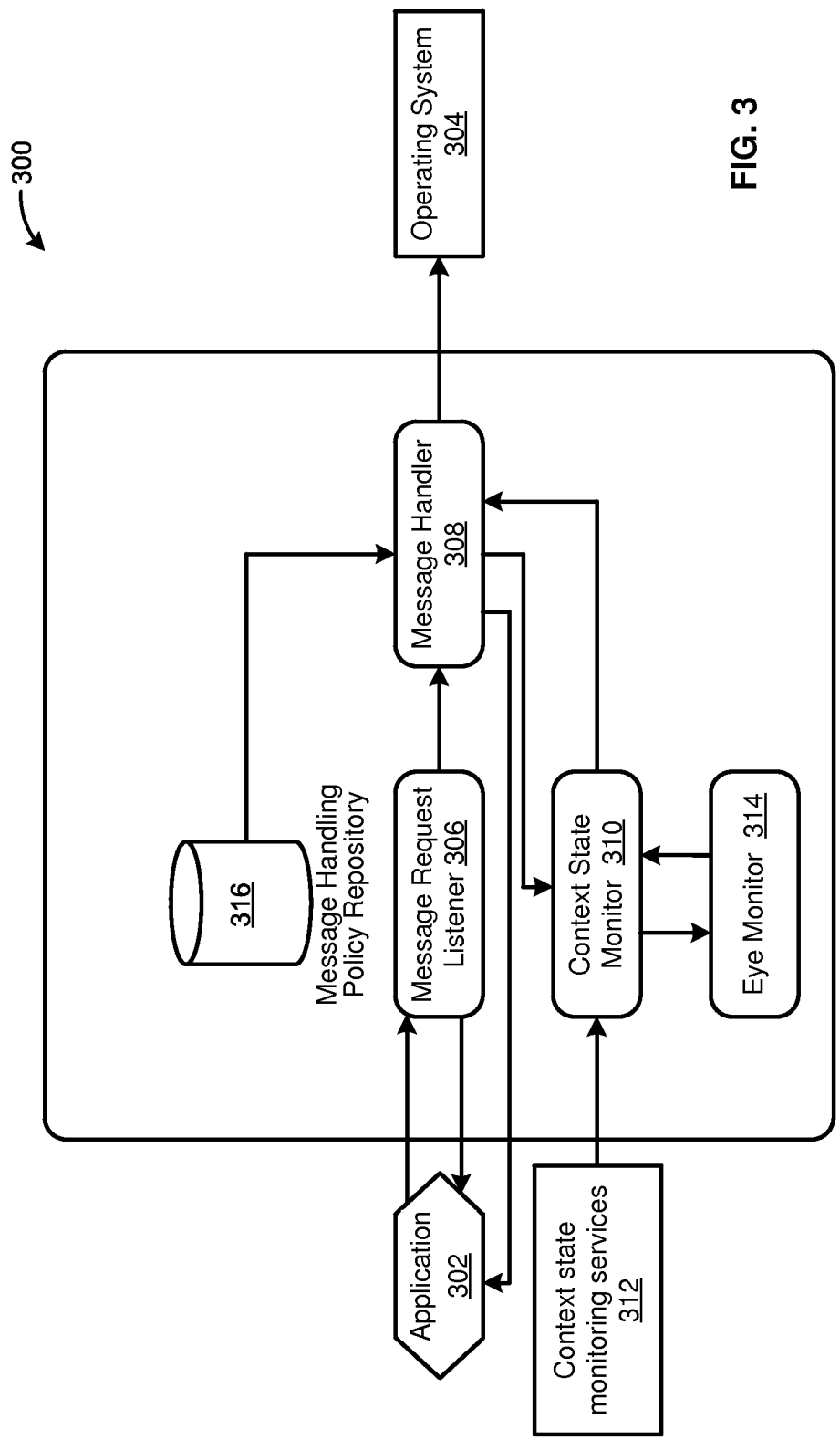
FIG. 3 is a block diagram illustrating a computing environment processing a message generation request, according to an embodiment.

FIG. 3 is a block diagram illustrating a computing environment 300 for processing a message generation request, according to an embodiment. Initially a message generation request from an application 302 to an operating system 304 is intercepted by a message request listener 306. In one embodiment, the message request listener 306 intercepts the message generation request before the message generation request reaches the operating system 304. The application may be executed on a portable electronic device. The message request listener 306 checks for any new message generation request sent from any of the applications on the portable electronic device to the operating system 304. The message request listener 306 then forwards the message generation request to a message handler 308.

Next the message handler 308 requests a context state monitor 310 to determine the values of the different context parameters included in the context state definition. The context state monitor 310 may use context state monitoring services 312, which determines the context values of the different context parameters and send the determined values to the context state monitor 310. For example, when the location (example coordinates) on the user interface of the portable electronic device at which a user is focusing is defined as one of the parameters of the context state definition then the context state monitor 310 may request an eye monitor 314 to determine the location (coordinates) on the user-interface of the portable electronic device on which the user is focusing at a particular time. The eye monitor 314 may respond to this request by determining the location on the user interface of the portable electronic device on which a user is focusing and this location (coordinate) information is then provided to the context state monitor 310.

The context state monitor 310 then transfers the current values of the different context parameters to the message handler 308. The message handler 308 then processes the message generation request, based on the message generation request and the received values of the context parameters. In one embodiment, a message handling policy stored in a message handling policy repository 316 is retrieved for processing the message generation request. The message handling policy may be retrieved by comparing the condition included in each of the message handling policy with the content of the message generation request and the values of the different context parameters. The comparison of the condition may include comparing the conditions included in each of the message handling policy with the content of the message generation request and the values of the different context parameters. Based on the comparison, the message handling policy that matches with the content of the message generation request and the context parameter values is selected. The message generation request is then processed according to the action included in the selected message handling policy.

For example, when the matched message handling policy has a condition "user working on critical project" then the message generation request may be processed according to the corresponding action included in the message generation request. The message generation request is a request that is to be transferred from the portable electronic device to the operating system. In the example, the corresponding action may be to delay sending the message generation request to the operating system until the user completes the critical project. In this case the context state monitor may constantly monitor the value of the context parameter "criticality of work user is performing" and when the value of this parameter changes to "user working on non-critical work" then the message generation request is forwarded to the operating system.

In one embodiment, the application 302 may provide a personalized and context-aware message handling. In this case, the application 302 may itself process the message generation request in a similar manner as the message handler 308, without the need for interception of the message generation request by the message request listener 306. Finally the message generation request is executed by either the operating system 304 or the message handler 308, depending on the action included in the selected message handling policy. In the example described in the previous paragraph, the message generation request is executed on the operating system 304 to generate the message. The generated message is then sent to the portable electronic device where it is displayed, for example, as a dialog, toast, or notification.

Figure 4A:
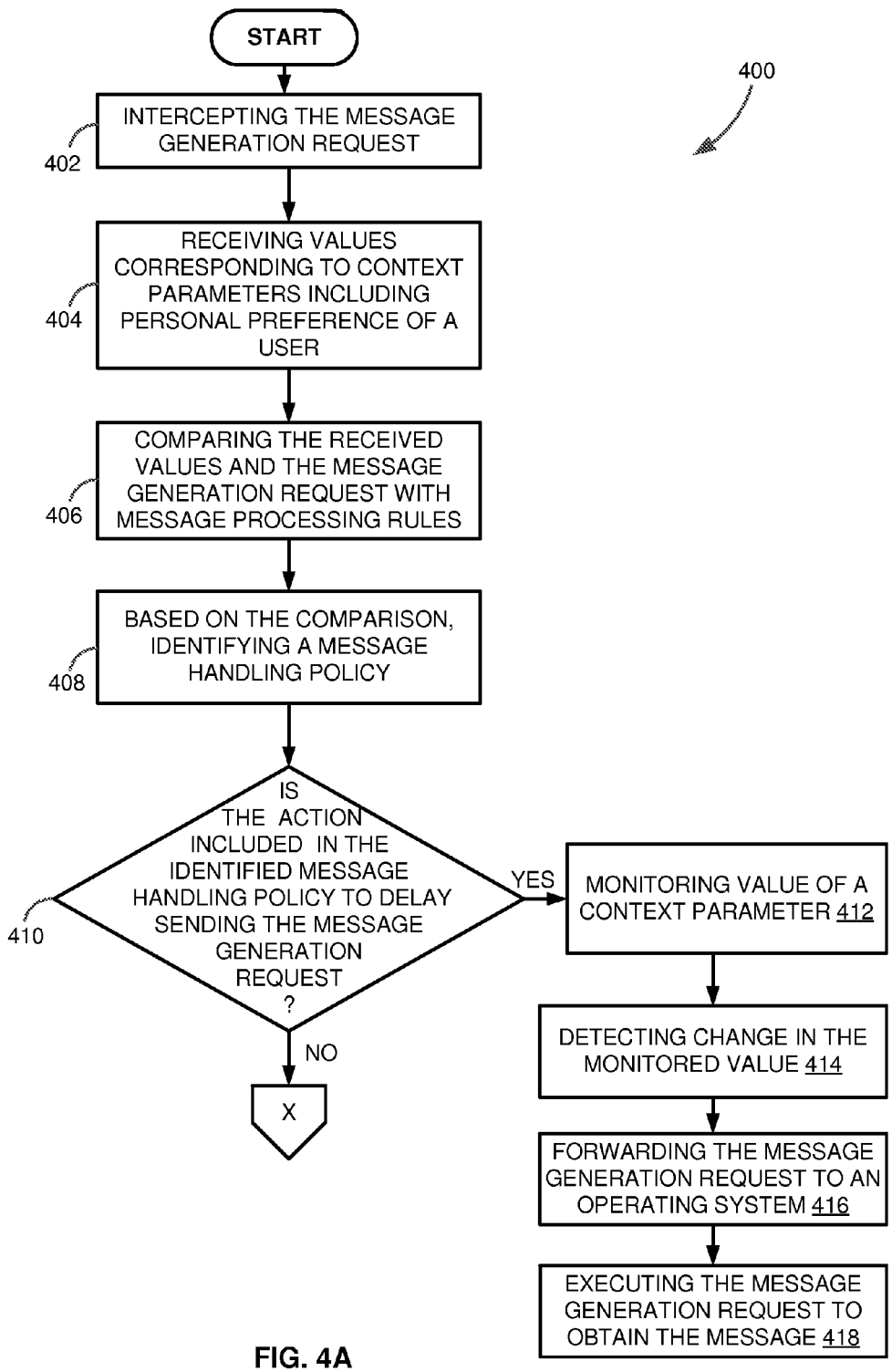
FIGS. 4A-4B is a flow diagram illustrating processing of message requests, according to an embodiment.
Figure 4B:
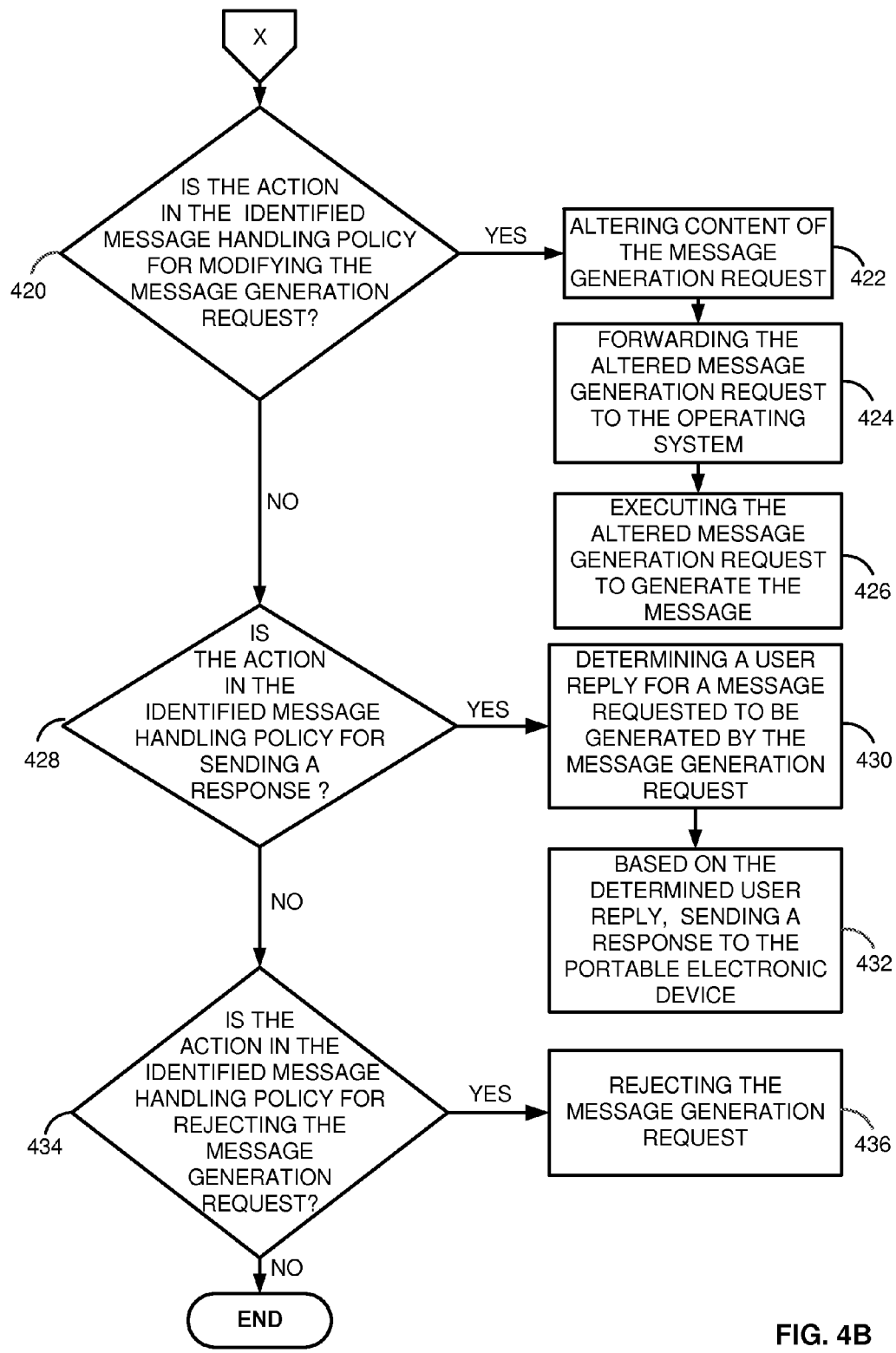

FIGS. 4A-4B is a block diagram 400 illustrating processing of message generation requests, according to an embodiment. Initially a message generation request is intercepted by the message handler (402). The message generation request may be received from an application on a portable electronic device for the operating system. The message handler then receives the values of the different context parameters, which may include user's personal preference (404).

Next a comparison is performed between the values of context parameters and the message generation request with the stored message handling policys (406). The comparison may be performed between the values of context parameters and the message generation request with the conditions included in the stored message handling policys. Based on the comparison, a message handling policy for processing the message generation request is identified (408).

Processing the message generation request may include executing the action included in the identified message generation request. For example, an action included in the identified message handling policy may be to delay sending of the message generation request, to the operating system, for a limited period of time until the value of one of the context parameters is changed. In case the action included in the message generation request is to delay the sending of the message generation request (condition in 410 is true) then value of one or more context parameters are monitored (412). The context parameter that needs to be monitored may be defined in the action of the identified message handling policy. For example, the context parameter that is monitored may be a "project status" that has a value "critical". The context state monitor may constantly provide the value of the context parameters to the message handler.

Next a change may be detected for the value being monitored by the context state monitor (414). The change may be detected when the value of the context parameter changes. In the example, the value of the "project status" may change from "critical" to "non-critical", which means the user is now working on a non-critical project. This may indicate that the user is now ready to receive message on the portable electronic device. Next the message generation request is forwarded to the operating system when the change is detected for the value of the context parameter (416). The forwarded message generation request is then executed by the operating system (418) to obtain the message. The generated message is then forwarded by the operating system to the portable electronic device. In one embodiment, the message may be displayed on the user interface of the portable electronic device. The information about the area of focus where the user is focusing may be used to display the message at that portion of the user interface where the user is presently focusing on the user interface of the portable electronic device.

The action in the identified message processing rule may also be for modifying the message generation request before it is sent to the operating system. For example, the content of message request may be changed so that the color of the window showing the message is changed, the location (coordinates) on the user interface of the portable electronic device where the message is displayed on the portable electronic device is changed, the number of buttons included on the user interface of the portable electronic device is changed, the contents of text or images of the message is changed, or the type of message displayed on the user interface is changed (for example, changing a toast message to a notification message). In case the action in the identified message processing rule is for modifying the message generation request (condition in 420 is true) then the content of the message generation request is altered (422). The altered message generation request is then forwarded to the operating system (424) that executes the altered message request to generate the message (426).

The action in the identified message processing rule may also be for sending a response to the application that sent the message generation request. The response may be sent, by the application handler, to the existing application that has sent the message generation request. The application handler may provide a response similar to a response that a user may have provided for a message generated by the message generation request. For example, when a message generation request is to display a dialog window with a confirmation for saving a file that has three options (Yes, No, Cancel) the message handler can send a response back to the application, which send the request, to emulate a user selecting a particular option (for example: Yes). The message generation request, in this case, is not forwarded to the operating system for execution. In case the action in the identified message generation request is for sending a response (condition in 428 is true), then a user reply is determined for a message requested to be generated by the message generation request (430). The message handler may have predetermined user responses stored to emulate a user selecting a particular option. Based on the determined user reply, a response is sent to the portable electronic device (432). In one embodiment, the response is sent to an application that sent the message generation request.

In another case, when the action in the identified message handling policy is for rejecting the message generation request (condition in 434 is true) then the message generation request is rejected (436).

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
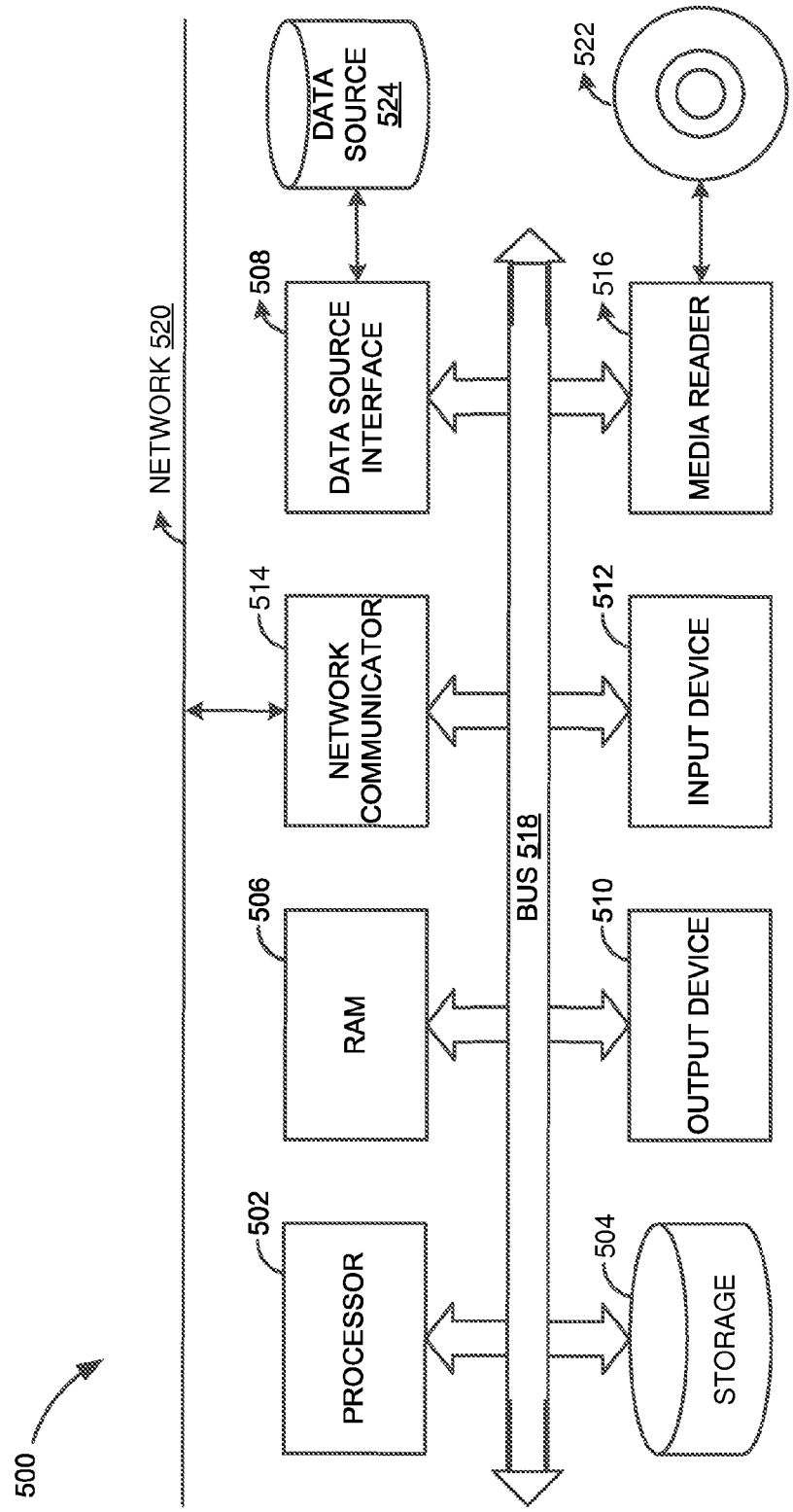
FIG. 5 is a block diagram illustrating a computing environment for personalized and context-aware processing of message generation request, according to an embodiment.

FIG. 5 is a block diagram of an exemplary computer system 500. The computer system 500 includes a processor 502 that executes software instructions or code stored on a computer readable storage medium 522 to perform the above-illustrated methods of the invention. The computer system 500 includes a media reader 516 to read the instructions from the computer readable storage medium 522 and store the instructions in storage 504 or in random access memory (RAM) 506. The storage 504 provides a large space for keeping static data where at least some instructions could be stored for later execution. The stored instructions may be further compiled to generate other representations of the instructions and dynamically stored in the RAM 506. The processor 502 reads instructions from the RAM 506 and performs actions as instructed. According to one embodiment, the computer system 500 further includes an output device 510 (e.g., a display) to provide at least some of the results of the execution as output including, but not limited to, visual information to users and an input device 512 to provide a user or another device with means for entering data and/or otherwise interact with the computer system 500. Output devices 510 and input devices 512 could be joined by one or more additional peripherals to further expand the capabilities of the computer system 500. A network communicator 514 may be provided to connect the computer system 500 to a network 520 and in turn to other devices connected to the network 520 including other clients, servers, data stores, and interfaces, for instance. The modules of the computer system 500 are interconnected via a bus 518. Computer system 500 includes a data source interface 508 to access data source 524. The data source 524 can be accessed via one or more abstraction layers implemented in hardware or software. For example, the data source 524 may be accessed by network 520. In some embodiments the data source 524 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for personalized and context-aware processing of message generation requests, the method comprising:

intercepting a message generation request from a portable electronic device to an operating system;

receiving, by a processor of the computer, a plurality of values corresponding to a plurality of context parameters, wherein the plurality of context parameters include a user preference related to the message generation request;

based on the received plurality of values and the message generation request, processing the message generation request to generate a message, wherein the processing is based on detecting a change in value of one or more of the plurality of context parameters;

based on the detected change, forwarding the message generation request to the operating system;

executing the message generation request, at the operating system, to generate the message; and sending the message to the portable electronic device, wherein the message to the portable electronic device is displayed based on the plurality of values corresponding to the plurality of context parameters.

2. The computer implemented method according to claim 1, wherein processing the message generation request comprises:
based on the determined plurality of values and the message generation request, identifying a message handling policy to process the message generation request; and
based on the determined plurality of values and the message generation request, processing, by the processor of the computer, the message generation request based on the identified message handling policy.

3. The computer implemented method according to claim 2, wherein processing the message generation request comprises:
based on the identified message handling policy, rejecting, by the processor of the computer, the intercepted message generation request.

4. The computer implemented method according to claim 1, wherein processing the message generation request comprises:
determining a user reply for the message requested to be generated by the message generation request, wherein an application on the portable electronic device sends the message generation request and wherein a message handler emulates the user to determine the user reply; and
based on the determined user reply, sending a response for the message generation request to the application on the portable electronic device.

5. The computer implemented method according to claim 1, wherein processing the message generation request comprises:
at a message handler, altering content of the intercepted message request to obtain an altered message request; and
forwarding the altered message generation request to the operating system.

6. The computer implemented according to claim 1, wherein determining the plurality of values comprises:
determining an area of focus on a user interface of the portable electronic device by an eye monitor and/or a head position monitor.

7. The computer implemented method according to claim 1, further comprises:
comparing, by the processor of the computer, the received values and the message generation request with a condition defined in a plurality of message handling policies; and
based on the comparison, identifying a message handling policy from the plurality of message handling policies to process the message generation request.

8. A non-transitory computer-readable storage medium to store instructions, which when executed by a computer, cause the computer to perform operations comprising:
intercept a message generation request from a portable electronic device to an operating system;
receive a plurality of values corresponding to a plurality of context parameters, wherein the plurality of context parameters include a user preference related to the message generation request;
based on the received plurality of values and the message generation request, process the message generation request to generate a message, wherein the processing is based on detecting a change in the value of one or more of the plurality of context parameters;
based on the detected change, forward the message generation request to the operating system;
execute the message generation request, at the operating system, to generate the message; and
send the message to the portable electronic device, wherein the message to the portable electronic device is displayed based on the plurality of values corresponding to the plurality of context parameters.

9. The non-transitory computer readable storage medium according to claim 8, further comprises instructions which when executed by the computer further causes the computer to:
based on the determined plurality of values and the message generation request, identify a message handling policy to process the message generation request; and
based on the determined plurality of values and the message generation request, process the message generation request based on the identified message handling policy.

10. The non-transitory computer readable storage medium according to claim 9, further comprises instructions which when executed by the computer further causes the computer to:
based on the identified message handling policy, reject the intercepted message generation request.

11. The non-transitory computer readable storage medium according to claim 8, further comprises instructions which when executed by the computer further causes the computer to:
determine a user reply for the message requested to be generated by the message generation request, wherein an application on the portable electronic device sends the message generation request and wherein a message handler emulates the user to determine the user reply; and
based on the determined user reply, send a response for the message generation request to the application on the portable electronic device.

12. The non-transitory computer readable storage medium according to claim 8, further comprises instructions which when executed by the computer further causes the computer to:
at a message handler, alter content of the intercepted message request to obtain an altered message request; and
forward the altered message generation request to the operating system.

13. The non-transitory computer readable storage medium according to claim 8, further comprises instructions which when executed by the computer further causes the computer to:
determine an area of focus on a user interface of the portable electronic device by an eye monitor.

14. A computer system for personalized and context-aware processing of message generation requests, the computer system comprising:
a processor to execute a program code; and
a memory coupled to the processor, the memory storing the program code comprising:
intercept a message generation request from a portable electronic device to an operating system;

receive a plurality of values corresponding to a plurality of context parameters, wherein the plurality of parameters include a user preference related to the message generation request;

based on the received plurality of values and the message generation request, process the message generation request to generate a message, wherein the processing is based on detecting a change in the value of one or more of the plurality of context parameters;

based on the detected change, forwarding the message generation request to the operating system;

executing the message generation request, at the operating system, to generate the message; and send the message to the portable electronic device, wherein the message to the portable electronic device is displayed based on the plurality of values corresponding to the plurality of context parameters.

15. The computer system according to claim 14, wherein the program code further comprises:

based on the determined plurality of values and the message generation request, identify a message handling policy to process the message generation request; and based on the determined plurality of values and the message generation request, process the message generation request based on the identified message handling policy.

16. The computer system according to claim 15, wherein the program code further comprises:

based on the identified message handling policy, reject the intercepted message generation request.

17. The computer system according to claim 14, wherein the program code further comprises:

determine a user reply for the message requested to be generated by the message generation request, wherein an application on the portable electronic device sends the message generation request and wherein a message handler emulates the user to determine the user reply; and based on the determined user reply, send a response for the message generation request to the application on the portable electronic device.

* * * * *